Feb. 21, 1933.   J. C. McCUNE   1,898,558
SAFETY CAR EQUIPMENT
Filed June 30, 1930
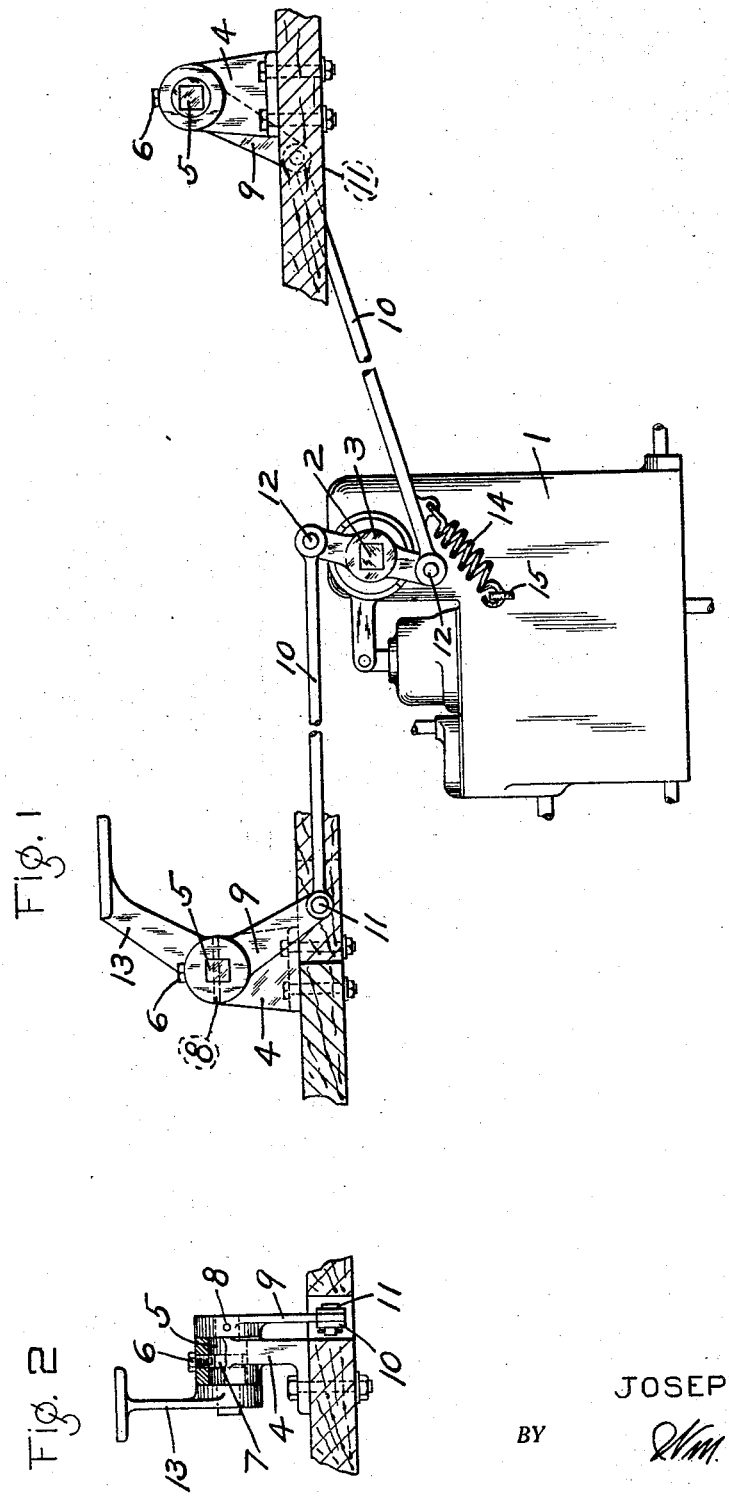
INVENTOR.
JOSEPH C. McCUNE
BY Wm. M. Cady
ATTORNEY.

Patented Feb. 21, 1933

1,898,558

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed June 30, 1930. Serial No. 464,803.

This invention relates to manually operated controlling devices for brake equipments and more particularly to the mechanism for operating said devices.

In the usual double end equipment for vehicles, a brake controlling means, such, for instance, as a brake valve device, is generally located at each end of the vehicle for controlling the brakes, which necessitates control pipes extending the length of the vehicle. This piping is objectionable, not only from the standpoint of complication and cost of installation, but it also retards the responsiveness of the brakes, due to the resistance to the flow of air through said piping.

One object of my invention is to provide a double end brake equipment in which a single brake control device is employed in order to avoid the above mentioned difficulties.

Another object of my invention is to provide a brake equipment employing a single brake control device with means for operating said device from either end of a vehicle.

Other objects and advantages will appear in the following more detailed description of the invention.

In the accompanying drawing; Fig. 1 is a diagrammatic view of a portion of a brake equipment embodying my invention; and Fig. 2 is an end elevation, partly in section, of the operating device for controlling the operation of the brake control device shown in Fig. 1.

As shown in the drawing, the brake equipment may comprise a brake valve device 1 disposed intermediate the ends of a vehicle for controlling the operation of the brakes on said vehicle and also comprises an operating device located at each end of said vehicle for controlling the operation of said brake valve device. For the purpose of illustrating my invention, I have shown in the drawing a brake valve device similar to that disclosed in my prior pending application, Serial No. 364,997, filed May 22, 1929, and since the detailed construction of the brake valve device does not enter into the present invention, only those parts as are deemed necessary for a full and complete understanding of my invention are shown and will be referred to.

The brake valve device 1 may comprise a casing having a rotatable shaft 2 mounted in said casing and a lever 3 mounted on said shaft in driving engagement therewith.

The operating device at each end of the vehicle may comprise a bracket 4 adapted to be secured to any desired part of the vehicle and having a shaft 5 rotatably mounted therein. Said shaft is held in said bracket by a stud bolt 6 having screw-threaded engagement with said bracket in an annular groove 7 in said shaft.

Secured to one end of the shaft 5 through the medium of a pin 8, is a lever 9, the free end of which is operatively connected to one end of an operating rod 10 by a pin 11, the other end of the rod being operatively connected to the lever 3 of the brake valve device by a pin 12.

At the operating end of the vehicle, there is removably mounted on the other end of the shaft 5, a pedal lever 13. Being removably mounted, said pedal lever may be mounted on and operatively engaged with the shaft 5 at either end of the vehicle.

Although the brake valve device in my pending application, hereinbefore mentioned, is provided with a torsion spring for rotating the shaft 2 in a clockwise direction, I have shown in the drawing in lieu thereof and for the sake of clarity, a spring 14 secured at one end to a lug 15 on the casing of the brake valve device and at the other end to the rod 10 for rotating the shaft 2.

In operation, to apply the brakes, the operator applies foot pressure to the pedal lever and thereby causes the operating mechanism to rotate the shaft of the brake valve device in a counter-clockwise direction against the resistance of the spring 14. To release the brakes, the operator relieves foot pressure from the pedal lever and thereby permits the spring 14 to rotate the shaft of the brake valve device in a clockwise direction to release position.

To change ends, the operator removes the pedal lever from the shaft 5 at the operating end of the vehicle and places said lever in driving engagement with the shaft 5 at the other end of the vehicle, from which end the brakes may be operated in a manner similar to that above described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

The combination with a brake valve device for controlling the brakes on a car, of a double ended lever for operating said device, rods connected to the opposite ends of said lever and extending to the opposite ends of the car, and operating mechanism at each end of the car comprising a bracket, a shaft mounted in said bracket, a lever carried by said shaft and operatively connected to each rod, and a pedal lever mounted on said shaft.

In testimony whereof I have hereunto set my hand, this 27th day of June, 1930.

JOSEPH C. McCUNE.